(12) United States Patent
Fröjdh

(10) Patent No.: US 6,625,369 B1
(45) Date of Patent: Sep. 23, 2003

(54) OPTICAL TRANSMITTER-RECEIVER MODULE

(75) Inventor: Krister Fröjdh, Älvsjö (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/461,372

(22) Filed: Dec. 15, 1999

(30) Foreign Application Priority Data

Dec. 15, 1998 (SE) ................................. 9804383

(51) Int. Cl.⁷ ................................. G02B 6/42
(52) U.S. Cl. .................... 385/132; 385/89; 359/154; 359/173
(58) Field of Search ................. 385/88–94, 76, 385/83, 37, 49–50, 129–132; 359/173, 154

(56) References Cited

U.S. PATENT DOCUMENTS

| 4,079,404 A | * | 3/1978 | Comerford et al. ........... 257/82 |
| 4,756,590 A | * | 7/1988 | Forrest et al. ................. 385/15 |
| 4,904,036 A | * | 2/1990 | Blonder ........................ 385/14 |
| 5,064,263 A | | 11/1991 | Stein ............................. 385/14 |
| 5,546,489 A | | 8/1996 | Sasaki et al. .................. 385/88 |

FOREIGN PATENT DOCUMENTS

| EP | 0649039 A1 | 4/1995 | |
| EP | 649039 A1 | * 4/1995 | ............ G02B/6/30 |

* cited by examiner

Primary Examiner—Akm Enayet Ullah
Assistant Examiner—Jerry T Rahll
(74) Attorney, Agent, or Firm—Nixon & Vanderhye, PC

(57) ABSTRACT

An optical receiver and transmitter module comprises a substrate and receiver, transmitter and monitor chips mounted behind each other on the surface of the substrate. Optical waveguides extend from an edge of the substrate up to active surfaces of the receiver and transmitter chips, these active surface all having the same orientation. The waveguides extending to the transmitter chip pass in grooves in the bottom surface of the receiver chip which is placed in front of the transmitter chip. No space on the substrate is required for bends of the waveguides which all have a substantially straight configuration which allows the substrate to be made with minimum dimensions.

10 Claims, 2 Drawing Sheets

OPTICAL TRANSMITTER-RECEIVER MODULE

The invention is related to an optical transmitter-receiver module, i.e. a module or assembly capable of both transmitting and receiving optical signals, i.e. signals modulated on light.

BACKGROUND

There is today a need for combined optical transmitters/receivers or transceivers. There is a particular interest in arranging multiple transmitters and receivers in the same array device. Then it may be advantageous either if the transmitter and the receiver can be located alternatingly or if the transmitter and the receiver can be multiplexed on the same fiber. A possible method is to monolithically integrate all these functions on one indium phosphide chip. However, it results in both a complicated simultaneous processing and difficulties associated with optical and electric crosstalk. Another method comprises the use of separate transmitter and receiver chips and arranging optical waveguides for conducting the light to and from the respective chips. The disadvantage of this method is that the substrate in which the waveguides are formed will be large and costly since the bends required in the waveguides have to be made rather large and thus the waveguides are area-consuming. The considerable space required by bends of waveguides is apparent from e.g U.S. Pat. No. 5,064,263 which discloses a receiver module for receiving a plurality of wavelengths on a single fiber.

SUMMARY

It is an object of the invention to provide an optical receiver and transmitter module which is the type chips mounted on a substrate and which can be made to have a small total area.

It is another object of the invention to provide an optical receiver and transmitter module which has a minimum of bends in waveguides between component chips and an edge of the module.

The problem to be solved by the invention is how to arrange the waveguides in or on an optical receiver and transmitter module so that the module has a small total area and so that the waveguides have as few and/or as small bends as possible.

An optical receiver and transmitter module comprises a substrate, a receiver or detector unit such as a semiconductor chip, and a transmitter or laser unit which can also be semiconductor chip. The units or components are preferably the array type and are mounted behind each other on the surface of the substrate having their front surfaces on which their optical interface surface are located all facing in the same direction, towards a connector edge of the substrate. Optical waveguides extend from an edge of the substrate up to the active surfaces of the receiver and transmitter chips. The waveguides extending to a rear one of the units pass in grooves in the bottom side of the other one of the units. This design allows a quite straight configuration of the waveguides. Since no space on the substrate is required for bends of the waveguides the substrate can be made with minimum dimensions.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which.

DETAILED DESCRIPTION

Figure 1:
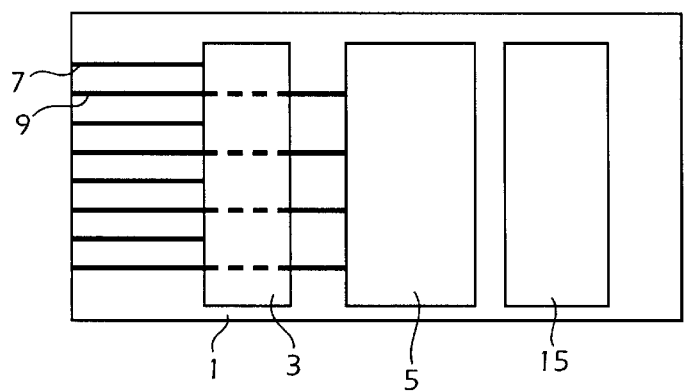
FIG. 1 is a schematic view from above of a substrate comprising integrated rectangular waveguides and having optical receiver and transmitter chips mounted thereon.
Figure 2:
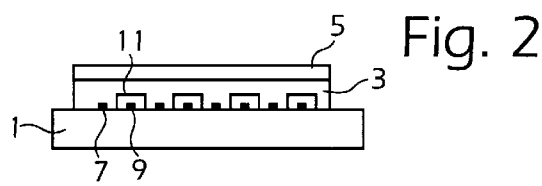
FIG. 2 is a schematic view as seen from the front of the substrate of FIG. 1.

In FIG. 1 a plan view of a substrate 1 having separate receiver and transmitter chips 3, 5 mounted thereon and optical waveguides 7, 9 for conducting the light to and from the respective chips is shown. The substrate 1 is a generally rectangular plate, for example made of silicon or of a suitable polymer material, having electrical conductors, not shown, applied therein and thereto, and the optical waveguides 7, 9 formed by applying layers having different refractive indices to the surface of the plate. The optical waveguides are here thus rectangular type waveguides, see the view from the front of the substrate in FIG. 2, having a core of a rectangular cross-section surrounded by an undercladding and overcladding, not shown. The waveguides 7, 9 extend in parallel to the long sides of the substrate 1 and end at short, front side or edge. They are preferably located with a uniform, regular spacing, the waveguides for transmitting light alternating with waveguides for receiving light. An MT (Mechanical Transfer) connector, not shown, can be attached to the front edge where all the waveguides end.

Figure 3:
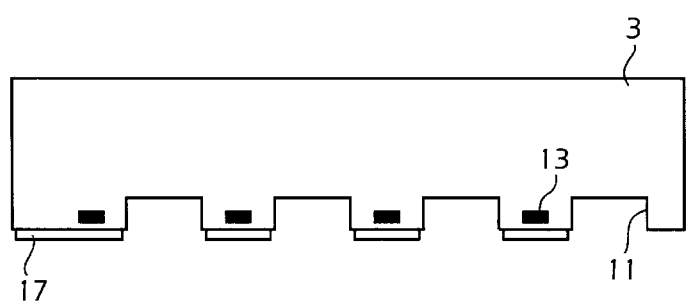
FIG. 3 is a schematic view from the front of a detector array used as the receiver chip illustrated in FIG. 1.

The waveguides 7 for receiving light all extend along straight paths from the front edge of the substrate 1 and end at active areas on a front side or edge of the receiver or detector chip 3. The waveguides 9 for transmitting light from the assembly extend along straight paths from the substrate front edge end past the detector chip 3 to the transmitter or laser chip 5 which is located behind the detector chip. These waveguides 9 all end at active areas of a front edge of the laser chip 5. They do not contact the detector chip 3, since the detector chip has ditches or grooves 11 formed in its bottom surface, see also the front view of the detector chip in FIG. 3. The ditches 11 can be made in a rather simple way by for instance sawing or milling, as long as they have a sufficient cross-section which preferably is rectangular and similar to that of the waveguides 9 passing in and through the ditches. The active detector areas 13 of the front edge of the detector chip 3 are then located between the grooves 11 as is illustrated in FIG. 3.

Figure 4:
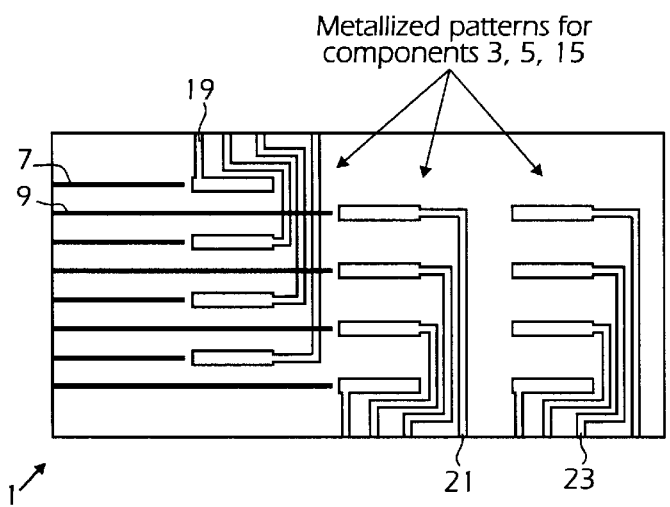
FIG. 4 is a schematic view from above of only the substrate of FIG. 1 illustrating the electrically conductive paths at the surface of the substrate.

Behind the laser chip 5 is a monitor diode chip 15 attached to the surface the substrate 1, the diode chip receiving some light issued in the backwards direction from the laser chip 5 in order to control the power level of the light issued from the elementary lasers into the waveguides 7. The electric connections of the chips 3, 5 and 15 appear from FIG. 4 in which a top view of the substrate 1 is shown. The electrical connections 19 for the receiver chip 3 can as illustrated be made to end at a long side of the substrate 1 and all the electrical connections 21, 23 for the transmitter chip 5 and the monitor chip 15 are then alpadvantageously arranged at the opposite long side of the substrate. This will reduce electrical cross-talk The chips can all be mounted to have their circuit or device surface at the bottom surface, so called flip-chip mounting, and they are then soldered or glued to the surface of the substrate plate 1. The contact pads 17 for the detector chip are visible in FIG. 3.

Figure 5:
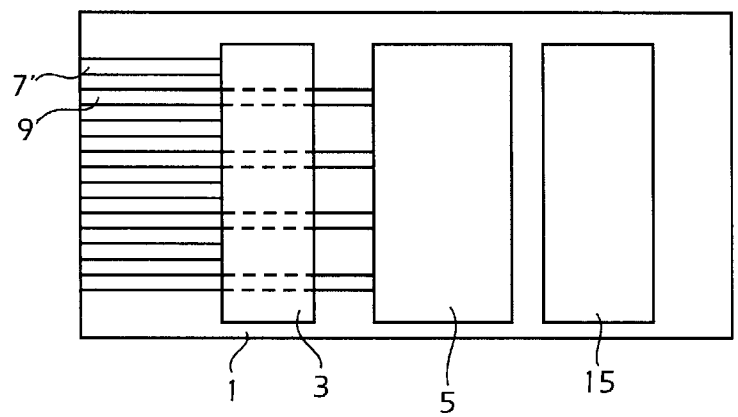
FIG. 5 is a schematic view similar to that of FIG. 1 of a substrate having optical fibers placed in V-grooves instead of integrated rectangular waveguides.
Figure 6:
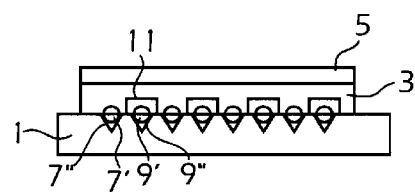
FIG. 6 is a schematic view as seen from the front of the substrate of FIG. 5.

The waveguides which as described above are integrated in the surface of the substrate 1 can be replaced by optical fibers placed in V-grooves. Such a design is illustrated in the plan view of FIG. 5 and the front view of FIG. 6. Here there are optical fibers 7'9' extending from the front edge of the substrate to the respective active areas on the front edges of the respective receiver and transmitter chips 3, 5. The optical fi, bers are placed in V-grooves 7", 9" which are produced in the surface layer of the substrate by e.g. etching. The fibers 9' for light transmitted from the module pass in grooves 11 in the bottom side of the detector chip in the same as in the first embodiment. There may be a problem of arranging the electrical connections to the element devices of the detector chip 3, since the electrical conductors therefor have to pass the V-grooves 5" for the transmitter fibers. The substrate can in this case be a multilayer polymer structure having deeply electrical conductors or when producing the substrate by moulding a polymer material a lead frame, not shown, can be placed in the mould, the lead frame having portions extending above the optical fibers 7' for the transmitted light, compare FIG. 4.

Figure 7:
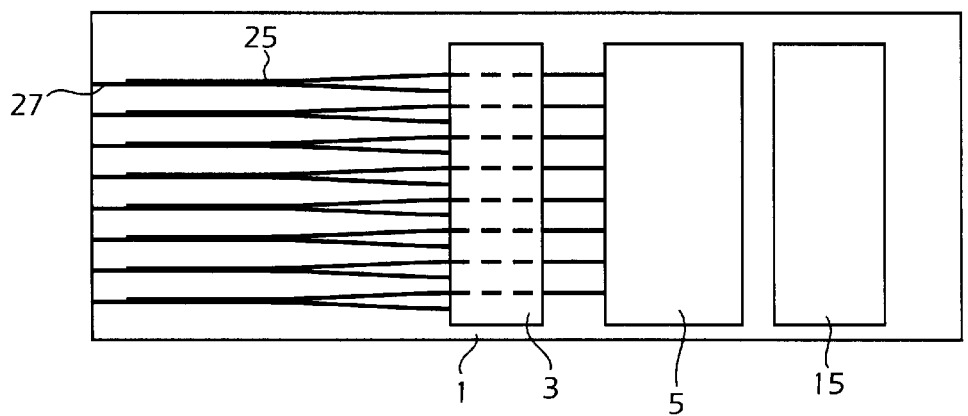
FIG. 7 is a schematic view similar to that of FIG. 1 of a substrate having waveguides provided with couplers.

In FIG. 7 an optical receiver and transmitter module is illustrated which have couplers 25 combining incoming and outgoing light on the same end fibers 27. The module of FIG. 7 can be obtained from that of FIG. 5 by prolonging the substrate 1 at the front edge and there making suitable recesses for the couplers and the end fiber pieces 27. Very small bends in the fibers 7' from the detector chip 3 and in the fibers 9' from the laser chip 5 are required since the lateral displacement or offset of fibers for the two chips is small. The couplers 25 can be selective as to wavelength if required.

An optical receiver and transmitter module has thus been described which is made on small substrate since no bends of the waveguides are required and which can be manufactured rather simply by only making parallell grooves in the active side of an. opto-electrical or electro-optical chip, the grooves being formed by e.g. sawing, milling or even etching.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An optical receiver and transmitter module comprising:
   a substrate having a surface,
   a receiver unit and a transmitter unit both of which are mounted on the surface of the substrate,
   a receiving optical waveguide located at the surface of the substrate and extending from the receiver unit, and
   a transmitting optical waveguide located at the surface of the substrate and extending from the transmitter unit,
   wherein a first unit selected among the receiver unit and the transmitter unit has a groove formed in a bottom surface of the first unit, a first waveguide of the set of the receiving optical waveguide and the transmitting optical waveguide extending from the first unit, a second waveguide of the set of the receiving optical waveguide and the transmitting optical waveguide extending from a second unit selected among the receiver unit and the transmitter unit, the second unit being different from the first unit, the second waveguide passing the first unit in the groove.

2. The optical receiver and transmitter module of claim 1, wherein the second waveguide extends, in a region where the second waveguide passes the first unit, in a direction parallel to a direction which the first waveguide has in a region at the first unit, and the groove has said direction.

3. The optical receiver and transmitter module of claim 1, wherein each of the receiver unit and the transmitter unit has an active area, from which the receiving optical waveguide and the transmitting optical waveguide respectively extends, and all the active areas are oriented in one direction.

4. The optical receiver and transmitter module of claim 3, wherein the receiver unit and the transmitter unit are located one behind the other one, taken in said one direction.

5. The optical receiver and transmitter module of claim 1, wherein each of the receiver unit and the transmitter unit has a front edge comprising an active area, from which the receiving optical waveguide and the transmitting optical waveguide respectively extends, the front edge of the receiver unit and the front edge of the transmitter being parallel to each other and the active area of one of the receiver unit and the transmitter unit being located behind the active area of the other of the receiver unit and the transmitter unit and laterally offset by a predetermined distance.

6. The optical receiver and transmitter module of claim 1, wherein the first unit has an active area at an edge, from which the first waveguide extends, the active area being located in a plane substantially perpendicular to a direction of the groove.

7. The optical receiver and transmitter module of claim 1, wherein the receiving optical waveguide and the transmitting optical waveguide extend in parallel to each other up to a front edge of the substrate.

8. The optical receiver and transmitter module of claim 1, further comprising:
   a coupler located at the substrate,
   a single optical waveguide extending from the coupler up to a front edge of the substrate, the receiving optical waveguide and the transmitting optical waveguide extending substantially in parallel to each other from the receiver unit and the transmitter unit respectively up to the coupler.

9. The optical receiver and transmitter module of claim 1, wherein the receiver unit and the transmitter unit are array devices comprising a same number of element receiver devices and transmitter devices respectively.

10. The optical receiver and transmitter module of claim 9, wherein receiving optical waveguides extend from all element receiver devices and transmitting optical waveguides extend from all element transmitter devices, the receiving optical waveguides and the transmitting optical waveguides being located with a regular spacing, the receiving optical waveguides alternating with the transmitting optical waveguides, and grooves being formed in the bottom surface of the first unit in which respective ones of the receiving optical waveguides and the transmitting optical waveguides extend.

* * * * *